US005972219A

United States Patent [19]

Habets et al.

[11] Patent Number: 5,972,219

[45] Date of Patent: Oct. 26, 1999

[54] PROCESS FOR AEROBIC TREATMENT OF WASTE WATER

[75] Inventors: Leonard Hubertus Alphonsus Habets, Sneek; Wilhelmus Johannes Bernardus Maria Driessen, Dronten, both of Netherlands

[73] Assignee: Paques B.V., Balk, Netherlands

[21] Appl. No.: 08/875,077

[22] PCT Filed: Jan. 31, 1996

[86] PCT No.: PCT/NL96/00048

§ 371 Date: Jul. 17, 1997

§ 102(e) Date: Jul. 17, 1997

[87] PCT Pub. No.: WO96/23735

PCT Pub. Date: Aug. 8, 1996

[30] Foreign Application Priority Data

Jan. 31, 1995 [NL] Netherlands ........................... 9500171

[51] Int. Cl.[6] ........................................................ C02F 3/30

[52] U.S. Cl. .......................... 210/604; 210/605; 210/621; 210/630; 210/151; 210/188; 210/218

[58] Field of Search .................................... 210/603–605, 210/615–617, 621, 630, 150, 151, 188, 195.3, 202, 218, 220

[56] References Cited

U.S. PATENT DOCUMENTS

| | | | |
|---|---|---|---|
| 4,009,098 | 2/1977 | Jeris | 210/604 |
| 4,451,372 | 5/1984 | Rovira | 210/605 |
| 4,482,458 | 11/1984 | Rovel et al. | 210/603 |
| 4,530,762 | 7/1985 | Love | 210/603 |
| 5,147,547 | 9/1992 | Savoll et al. | 210/605 |
| 5,338,445 | 8/1994 | Zumbragel et al. | 210/603 |
| 5,518,618 | 5/1996 | Mulder et al. | 210/605 |

FOREIGN PATENT DOCUMENTS

| | | |
|---|---|---|
| 0 143 149 | 6/1985 | European Pat. Off. . |
| 205 877 | 1/1984 | Germany . |
| WO 93/25485 | 12/1993 | WIPO . |

OTHER PUBLICATIONS

*Patent Abstracts of Japan,* vol. 007, No. 219, Sep. 1983.
*Patent Abstracts of Japan,* vol. 013, No. 431, Sep. 1989.
*Patent Abstracts of Japan,* vol. 12, No. 11, Jan. 1988.
*Patent Abstracts of Japan,* vol. 12, No. 501, Dec. 1988.
*Patent Abstracts of Japan,* vol. 007, No. 061, Mar. 1983.

*Primary Examiner*—Thomas G. Wyse
*Attorney, Agent, or Firm*—Young & Thompson

[57] ABSTRACT

A process is described for the aerobic treatment of effluent in a reactor of the UASB type, into the bottom of which the effluent to be treated is fed and, at the same time, oxygen is fed in an amount such that the growth of a facultative and an aerobic biomass is promoted. An apparatus for the aerobic treatment of effluent is also described, which apparatus consists of a UASB rector, distributors for supplying liquid and aeration means being located at the bottom of the reactor and means for integrated settling of biomass and gas collection being located at the top of the reactor. The apparatus can also be an integrated anaerobic/aerobic reactor.

12 Claims, 2 Drawing Sheets

PROCESS FOR AEROBIC TREATMENT OF WASTE WATER

FIELD OF THE INVENTION

The invention relates to a process and an apparatus for the aerobic treatment of waste water in an aerated reactor into which the effluent to be treated is fed at the bottom.

BACKGROUND OF THE INVENTION

The biological treatment of waste water can essentially take place in two ways, i.e. aerobically by making use of microorganisms which use oxygen, and anaerobically by growth of microorganisms in the absence of oxygen. Both methods have found their place in the art of waste water treatment. The first method is used mainly when there is a low degree of contamination, at low water temperature and as a polishing treatment. The second method offers advantages especially as a pretreatment for more severe organic contamination and at higher water temperature. Both methods are adequately known.

Nowadays anaerobic reactors are frequently placed in series with aerobic reactors. such as, for example:

1. compact anaerobic pretreatment followed by aerobic after-treatment ("polishing") for extensive removal of BOD/COD;
2. nitrification followed by denitrification for extensive removal of nitrogen;
3. sulphate reduction followed by oxidation of sulphide to elemental sulphur for removal of sulphur.

To an increasing extent the existence of aerobic and anaerobic reactions which take place simultaneously in the same reactor is also being reported. Examples of these are nitrification/idenitrification reactions and denitrification under the influence of sulphide oxidation.

Anaerobic processes can also be the reason for low sludge growth figures in highly loaded aerobic systems. The use of a relatively low oxygen pressure in a reactor containing agglomerated (flocculated) biomass can lead to rapid conversion of oxygen-binding substances by aerobic bacteria which are present in the outer layer of the flocs. These bacteria preferably store the nutrition as reserves in the form of polysaccharides outside their cells.

Subsequently the bacteria get no opportunity to use these reserves because of lack of oxygen, and these reserves therefore start to serve as a substrate for anaerobic mineralization processes in the interior of the floc, where no oxygen can penetrate. As a result a simultaneous build-up and break-down of the polysaccharides is produced, the polysaccharides also serving as an adhesive for the cohesive bacterial culture. Protozoa can also play an important role as bacteria-consuming predators with a low net sludge yield.

In this context the term micro-aerophilic is indeed used to indicate that less oxygen is fed to the system than would be necessary by reason of a complete aerobic reaction. This has the result that a bacterial population develops which can multiply under a very low oxygen pressure. A disadvantage of these conditions can be that foul-smelling substances can be produced, such as $H_2S$, $NH_3$ or volatile organic acids. These can be stripped off by air bubbles and pass into the outside air. It can therefore be important that this air is collected for treatment if necessary.

On the other hand, it is important that sufficient inoculating material remains present in the reactor and that the flocs formed are not flushed out before the anaerobic mineralization processes have taken place.

Recent research has revealed that anaerobic bacteria can have a high tolerance to oxygen (M. T. Kato, Biotech. Bioeng. 42: 1360–1366 (1993)). The addition of oxygen can sometimes also be advantageous for an anaerobic process, for example for suppressing sulphate reduction in fermentation tanks, as described in EP-A 143 149. in this latter process, organic solid waste present in a slurry is converted with the generation of a gas which contains methane as the main constituent, also containing a small proportion of up to 3%, and more particularly 0.1–1.5% by vol., of oxygen.

The retention of biomass in a reactor for waste water treatment is of essential importance for the capacity of said reactor. In conventional aerobic treatment this is usually achieved by continuously returning the sludge (=biomass) separated off outside the reactor, by means of settling, to the aeration tank where the biological reactions take place. This process in which the sludge concentration in the aeration tank is 3–6 g/l, is termed the activated sludge process. The same principle is also applied for the earlier anaerobic treatment systems, although the sludge is then usually separated off with the aid of lamellae separators before it is recycled to the anaerobic reactor chamber. This process is known as the contact process.

An improvement in the anaerobic contact process relates to the use of systems with which sludge retention is achieved in a different way, for example by integrating the settling chamber with the reaction chamber or by counteracting the flushing out of biomass by immobilization on carrier material. It is important for accumulation that the residence time of the sludge is considerable longer than the division time of the various microorganisms. This is particularly important for the anaerobic process, because the growth rate is very low. The development of the "Upflow Anaerobic Sludge Blanket" reactor, known all over the world as the UASB reactor. in the 1970s was an important step forward for anaerobic treatment. The majority of anaerobic treatments are now carried out in this type of reactor.

The characteristic of the UASB reactor is that the effluent to be treated is fed in and distributed over the bottom of a tank, from where it flows slowly upwards through a layer of biomass. During the contact with the biomass, a gas mixture is produced which consists mainly of $CH_4$, $CO_2$ and $H_2S$; this mixture is known as biogas. The biogas bubbles upwards and thus provides for a certain degree of mixing. As a result of clever positioning of gas collection hoods below the water surface. the gas bubbles do not reach the water surface, with the result that a calm zone is produced at the top and any sludge particles swirled up are able to settle into the layer of biomass (the "sludge blanket") again. The sludge concentration in a UASB reactor is generally between 40 and 120 g/l, usually at 80 to 90 g/l. The UASB reactor is described in many patents, inter alia in EP-A 193 999 and EP-A 244 029. One reason why the UASB reactor has become the most popular anaerobic system is the fact that, with proper process control, the biomass can be allowed to grow in the form of spherical particles a few mm in size which settle very well.

In the meantime extensions or variants based on the principle of the UASB have been proposed which have higher flow speeds, for example as a result of recycling effluent, by using the biogas as an integral pump, or simply by building narrower high columns. The basic principle, however, remains the same as that of the UASB.

SUMMARY OF THE INVENTION

The invention relates to the use of an aerobic waste water treatment in a UASB reactor as described above. The process according to the invention is, thus, characterized in that use is made of a UASB reactor into the bottom of which oxygen is also fed, specifically in an amount such that the growth of a facultative and an aerobic biomass is promoted. This implies that a UASB reactor is equipped with an aeration installation, preferably, with fine bubbles. A reactor of this type can be used as an independent unit or in combination with an anaerobic pretreatment. In specific cases, a reactor can also be alternately operated anaerobically and aerobically, for example in seasonal operations with severely fluctuating amounts of waste water. The process can, in principle, be used for many purposes, for example for COD/BOD removal, nitrification, denitrification and sulphide oxidation.

As a result of the upflow principle and the integral settling, it is possible to accumulate biomass in a large amount, which is more than in the activated sludge process and less than in an anaerobically operated UASB reactor. The concentration of the biomass at the bottom of the reactor is preferably 0.5–75 g/l, more particularly 5–50 or 10–50 g/l. When the process is used as an aerobic treatment subsequent to anaerobic treatment, the biomass concentration may be lower, e.g. 0.5–10 g/l.

This good sludge retention is dependent both on the aeration intensity and on the hydraulic loading on the reactor. A low degree of aeration is suitable with a high hydraulic loading, and vice versa. For instance, for a specific case of a water loading of 4.0 $m^3/m^2.h$, the degree of aeration is preferably below 0.9 $m^3/m^2.h$, whilst for a water loading of 1.2 $m^3/m^2.h$ or less, the degree of aeration for sludge retention is virtually unrestricted. Conversely, for a degree of aeration of 4.0 $m^3/m^2.h$, the water loading is preferably less than 1.3 $m^3/m^2.h$, whilst for a degree of aeration of 0.8 $m^3/m^2.h$ or less, the water loading for sludge retention is virtually unrestricted. The relationships are shown in a plot in FIG. 1. Depending on the reactor dimensions and the sludge used, the figures which apply can differ from those mentioned here, but the trend remains the same.

Thus, the process can be used for dilute and for concentrated waste water. Because a high density of biomass at the bottom of the reactor is used, the oxygen is not able to penetrate everywhere, with the result that anaerobic sludge mineralization can take place. As a result, the spent air which escapes can contain traces of methane, but no more than 10% by vol. Furthermore, as a result of the relatively short residence time of the air or oxygen bubbles, not all oxygen is able to dissolve in the water and the air which escapes will contain at least 2% by vol., in particular more than 3% by vol., and up to, for example, 15% by vol. of residual oxygen. The remainder of the residual gas consists mainly of carbon dioxide and nitrogen and, possibly, methane.

The apparatus according to the invention for the aerobic treatment of waste water consists of a UASB reactor with the associated distributed water feed at the bottom of the reactor and means for integrated settling of biomass and gas collection (so-called 3-phase separation) at the top of the reactor. An integrated separation of this type generally involves the gas collection taking place beneath the liquid surface by means of gas hoods which, seen from above, extend over the full cross-section of the reactor. In the apparatus according to the invention, in contrast to a conventional UASB reactor, aeration means are located at the bottom of the reactor, either below or above the feed water distributors, or a the same level. The height of the reactor can vary from 4 to 14 metres, preferably 4.5 to 10 metres. In this context, "at the top of the reactor" means in the upper part of the reactor, i.e. at between the highest liquid level (full effective height) of the reactor and 0.75 times the effective height. Similarly "at the bottom of the reactor means in the lower part of the reactor, i.e. between the lowest liquid level and 0.25 times the effective height.

In the case of a combined anaerobic and aerobic treatment, the aerobic reactor is usually placed alongside the anaerobic reactor, the anaerobic and aerobic reactors being separate reactors. In this case the air ventilated from the anaerobic reactor can serve as aeration for the aerobic reactor.

The anaerobic and aerobic reactors can also be integrated vertically in one reactor tank. In such a vertically integrated reactor tank, the aeration means are located above the gas collection for the anaerobic section. An apparatus of this type for integrated anaerobic and aerobic treatment of waste water consists of a UASB reactor, in which distributors for supplying liquid are located at the bottom of the reactor, gas collection means are positioned in the mid-section and aeration means are positioned above these, and means for integrated settling of biomass and gas collection are located at the top of the reactor. The gas hoods for the anaerobic section and aeration means are not necessarily located at precisely mid-height of the reactor. Thus, "in the mid-section" means between 0.25 and 0.75 times the effective height of the reactor. Depending on the type of waste water to be treated, the location of these components can be lower or higher. In this case the total height of the reactor can vary from preferably 6 to 25 metres.

In a particular embodiment of the apparatus according to the invention, the aeration means are vertically movable over a part of the reactor height. This can be performed e.g. by means of a framework on which aerators are arranged at the upper side and optionally gas hoods are arranged at the lower side, which framework can be mechanically raised and lowered with respect to the reactor height. This embodiment allows easy adaptation of the reactor configuration to the specific waste water and the desired purification results.

In the case of the process with integrated anaerobic/aerobic treatment, the water feed rate can be adjusted so that the sludge balance is optimum, that is to say that the anaerobic sludge remains in the bottom half of the reactor and the aerobic sludge remains in the top half. If extensive sludge production takes place in the aerobic section, the surplus sludge can be allowed to settle into the anaerobic phase by lowering the water feed rate, so that the quantity of aerobic biomass becomes constant again. The surplus aerobic sludge can also become heavier in the course of time and settle into the anaerobic phase by itself.

A variant of the apparatus for vertically integrated anaerobic and aerobic treatment of waste water described above comprises, instead of the means for integrated settling of biomass gas collection at the top a reactor, a packing material for supporting aerobic bacteria in the top section of the reactor. The packing material may comprise filters or other means of immobilizing aerobic bacteria. In this embodiment, the gas issuing from the aerobic phase can be collected above the reactor or it can simply be vented into the atmosphere. An effective 3-phase separation above the lower, anaerobic section is important here, in order to prevent anaerobic gas from interfering with the aerobic process. Again the aeration means. and preferably also the anaerobic gas collectors, may be vertically movable.

BRIEF DESCRIPTION OF THE INVENTION

DESCRIPTION OF THE PREFERRED EMBODIMENTS

Figure 1:
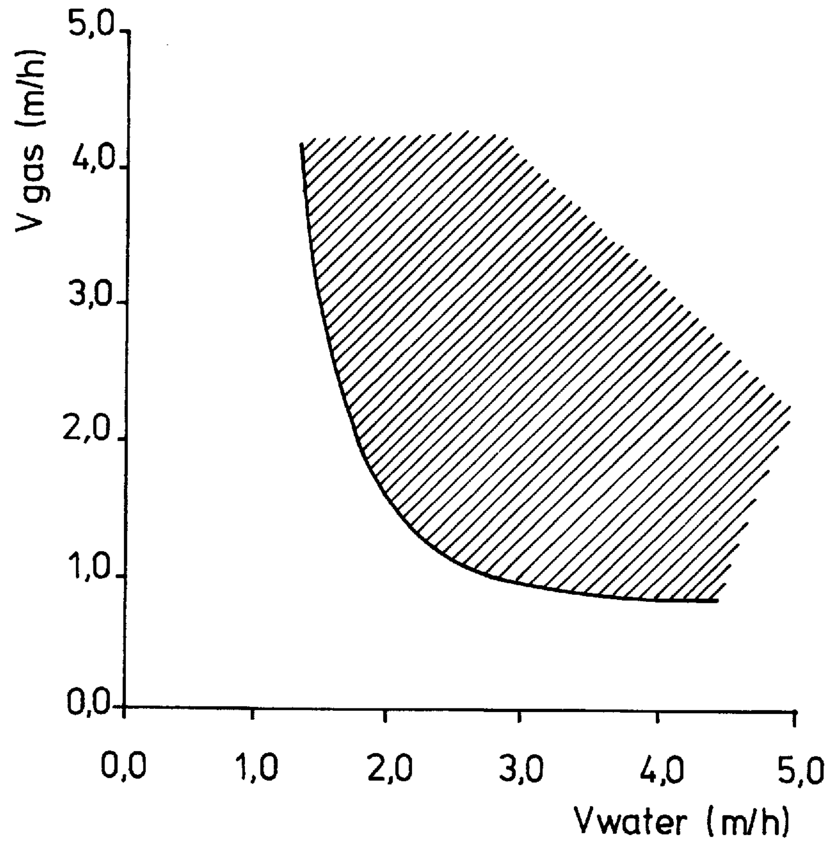
FIG. 1 shows a measurement of the relationship between hydraulic loading ($V_{water}$) and aeration rate ($V_{gas}$). $V_{water}$ and $V_{gas}$ are shown in $m/h=m^3/m^2.h$. The shaded area is the region where sludge is flushed out.
Figure 2:
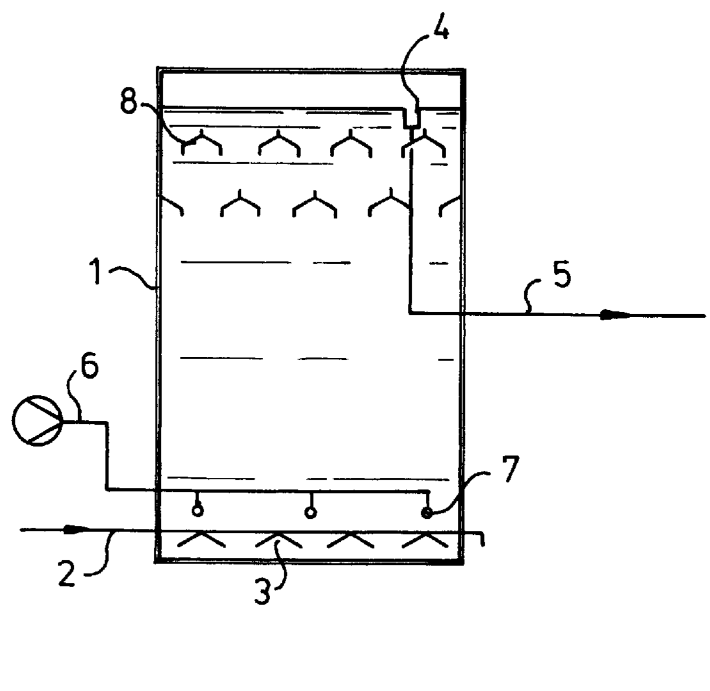
FIG. 2 shows an apparatus for separate aerobic treatment.

With reference to FIG. 2, reactor 1 is a UASB reactor. Waste water, which optionally has been subjected to anaerobic pre-treatment, is fed via feed 2 and distributors 3 into the bottom of the reactor in such a way that virtually a vertical plug flow is produced. The treated water is discharged via overflow 4 at the top of the reactor and discharge line 5. Air or oxygen is supplied via line 6 fitted with a compressor and is dispersed in the water via distributors 7. The gas hoods 8 at the top of the reactor collect the residual gas, there being sufficient space above the hoods for settling of the aerobic sludge. The gas hoods are provided with discharge lines (not shown) for the residual gas.

Figure 3:
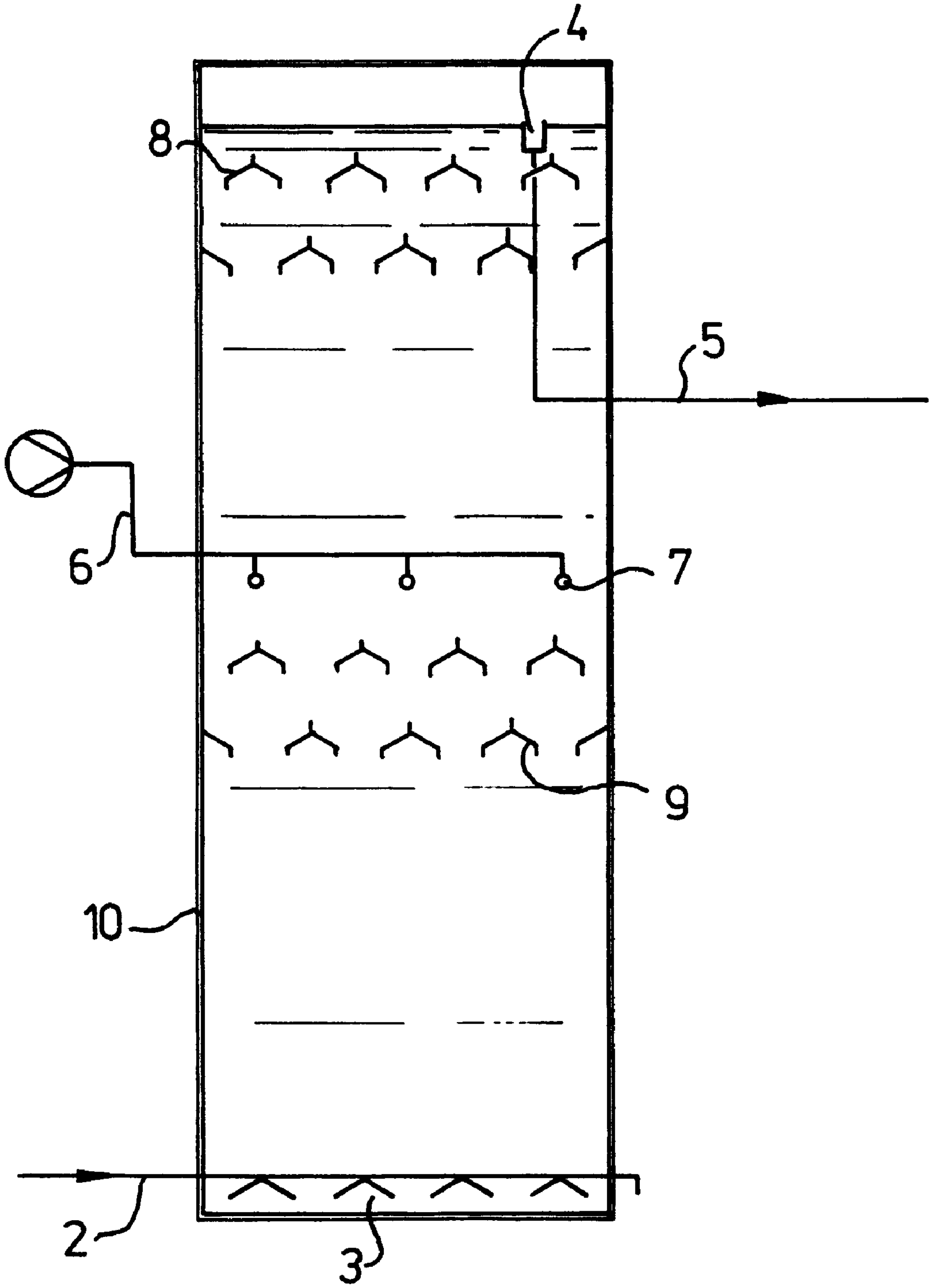
FIG. 3 shows an apparatus for integrated anaerobic and aerobic treatment.

In respect of the components of FIG. 3 not discussed here, the reactor 10 is comparable to the reactor in FIG. 2. Gas hoods 9 for removal of the anaerobic gas (mainly methane) are located in the mid-section of reactor 10. The air distributors 7 are positioned above said hoods.

Example 1

A UASB-type pilot reactor as depicted in FIG. 2 having a capacity of 12 $m^3$, an effective (liquid) height of 4.5 m and a bottom surface area of 2.67 $m^2$ was used as a micro-aerophilic reactor without anaerobic pretreatment. Untreated papermill waste water having a COD of about 1500 mg/l was fed into the reactor at a rate of 1.5 $m^3/h$ (upflow velocity $V_{up}$ 0.56 m/h). The reactor was aerated at 12 $m^3/h$ of air ($V_{up}$ 4.5 m/h). The reactor temperature was about 30° C. and pH was neutral. No detectable odour components were present in the spent air.

After one week of adaptation the results were as follows:

| | $COD_{total}$ | $COD_{filtered}$ | acetate | propionate |
|---|---|---|---|---|
| influent (mg/l) | 1515 | 1455 | 426 | 181 |
| effluent (mg/1) | 1006 | 762 | 198 | 93 |
| efficiency (%) | 33 | 47 | 53 | 48 |

Further optimization leads to an efficiency of total COD removal of 75% or more.

Example 2

The same reactor of example 1 was used as an aerobic post-treatment reactor. Anaerobically pretreated papermill waste water having a COD of about 600 mg/l was fed into the reactor at a rate of 4.0 $m^3/h$ (upflow velocity $V_{up}$ 1.5 m/h). The reactor was aerated with 3.5 $m^3/h$ of air ($V_{up}$ 1.3 m/h). No detectable odour components were present in the spent air.

The COD values, before and after filtration of the sample, were as follows:

| | $COD_{total}$ | $COD_{filtered}$ |
|---|---|---|
| influent (mg/l) | 621 | 543 |
| effluent (mg/1) | 465 | 249 |
| efficiency (%) | 25 | 54 |

These values show that the reactor converts a considerable part of the residual COD after anaerobic treatment.

We claim:

1. A process for the aerobic treatment of waste water in an aerated reactor, said reactor being an Upflow Anaerobic Sludge Blanket type reactor having a bottom and a top, the process comprising:

feeding and distributing the waste water to be treated to the bottom of the reactor;

moving the waste water upwards through a layer of biomass sludge;

collecting gas from above the layer of biomass sludge;

settling biomass sludge;

feeding oxygen-containing gas into the bottom of the reactor in an amount such that the growth of a facultative and an aerobic biomass is promoted; and discharging treated waste water from the top of the reactor.

2. The process according to claim 1, wherein the amount of oxygen fed is such that the gas collected from the reactor contains at least 2% by volume of oxygen.

3. The process according to claim 1, wherein the amount of oxygen fed is such that the gas collected from the reactor contains at least 3% by volume of oxygen.

4. The process according to claim 1, wherein the oxygen-containing gas is air fed by bubble aeration.

5. The process according to claim 1, wherein the concentration of biomass at the bottom of the reactor is 5 to 50 g/l.

6. The process according to claim 1, wherein the aerobic treatment is carried out in combination with an anaerobic pretreatment.

7. The process according to claim 6, wherein air ventilated from the anaerobic pretreatment is used for aeration in the aerobic treatment.

8. The process according to claim 6, wherein the aerobic treatment and the anaerobic pretreatment are carried out in the same reactor.

9. The process according to claim 8, wherein the waste water feed rate is adjusted such that the quantity of aerobic biomass remains approximately constant.

10. An apparatus for integrated anaerobic and aerobic treatment of waste water, consisting of an Upflow Anaerobic Sludge Blanket-type reactor having a bottom and a top, and comprising:

distributor means located at the bottom for supplying waste water to the reactor;

first gas collection means positioned above the distributor means for collecting anaerobic gases;

aeration means located above said first gas collection means for supplying oxygen;

second means located above said aeration means for separating biomass and collecting gases; and means for withdrawing treated water from the top of the reactor.

11. The apparatus according to claim 10, wherein said aeration means are movable over a part of the height of the reactor.

12. An apparatus for integrated anaerobic and aerobic treatment of waste water, consisting of an Upflow Anaerobic Sludge Blanket-type reactor having a bottom and a top, and comprising:

distributor means located at the bottom for supplying waste water to the reactor;

gas collection means positioned above the distributor means for collecting anaerobic gases;

aeration means located above said first gas collection means for supplying oxygen;

packing material located above said aeration means for supporting aerobic bacteria; and means for withdrawing treated water from the top of the reactor.

* * * * *